UNITED STATES PATENT OFFICE.

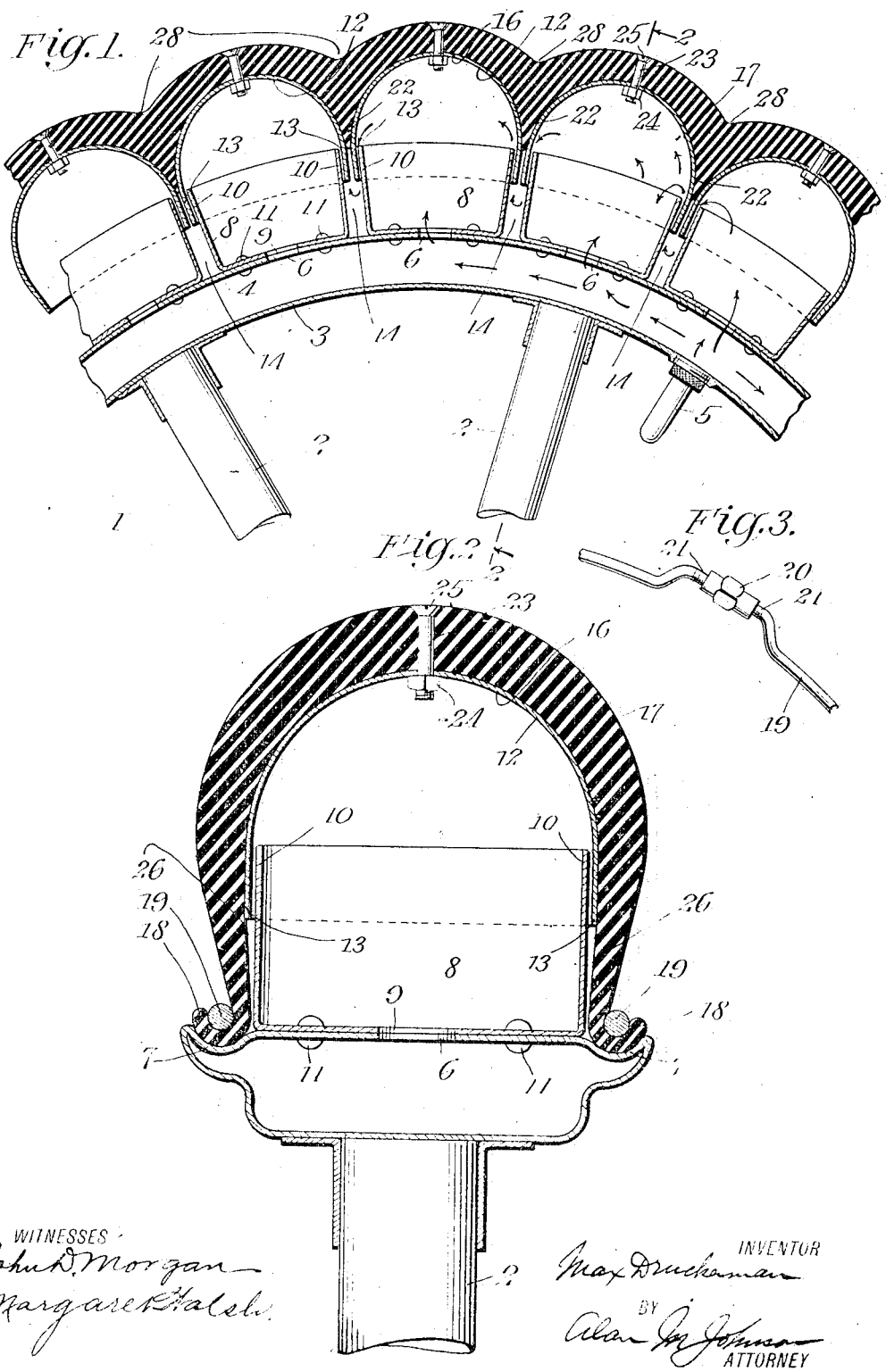

MAX DRUCKERMAN, OF BROOKLYN, NEW YORK.

PUNCTURE-PROOF VEHICLE-WHEEL.

1,121,235. Specification of Letters Patent. Patented Dec. 15, 1914.

Application filed February 3, 1914. Serial No. 816,150.

*To all whom it may concern:*

Be it known that I, MAX DRUCKERMAN, a citizen of the United States, and a resident of Brooklyn, in the county of Kings and State of New York, have invented certain new and useful Improvements in Puncture-Proof Vehicle-Wheels, of which the following is a specification, taken in connection with the accompanying drawing, which forms a part of the same.

My invention relates to vehicle wheels, and more particularly to one for power driven vehicles in which the resiliency of a pneumatic tire is obtained without the constant annoyance of punctures, blow-outs and similar unavoidable accidents incident to using an inflatable inner rubber tube and the ordinary outer shoe.

My invention relates broadly to such a puncture proof vehicle wheel, as well as to certain details of construction, which will be more fully hereinafter set forth in the specification and claim.

In the accompanying drawing showing an illustrative embodiment of my invention and in which the same reference numerals refer to similar parts in the several figures; Figure 1 is a fragmentary horizontal section through my puncture proof vehicle wheel certain portions of the drawings being somewhat exaggerated for clearer illustration; Fig. 2 is a transverse vertical section substantially on the line of 2—2 in Fig. 1; and Fig. 3 is a fragmentary portion of one form of clencher locking ring.

In the illustrative embodiment of my invention shown in the drawing 1 is a vehicle wheel formed of any suitable spokes 2 and preferably a hollow rim 3 having an air chamber 4 communicating with a valve 5 of any suitable construction. The periphery of the rim 3 is provided with a plurality of openings 6, 6 and also, on either side, with a clencher groove 7.

I mount on the periphery of the rim 3, in any suitable manner, a series of hollow, substantially rigid members which communicate with the air chamber 4 in the rim and are provided with flanges to coöperate with a series of coöperating movable members adapted to have a radial movement with relation to the first members. I also, though not necessarily, provide air passages from one pair of fixed and hollow members to the adjacent pair of such members, which passage is in addition to the one through the air chamber 4 in the rim 3.

Preferably, I make the rigid, hollow members in the form of cups 8 having openings 9 which register with the openings 6 in the rim 3 and provide them with flanges 10, 10. These cups may be secured to the ring in any suitable manner, such as by the rivets 11, 11.

Mounted over each rigid, hollow member or cup 8 I mount a similar coöperating movable outer cup member 12 having flanges 13, 13 to coöperate with the flanges 10, 10 of a rigid member. Preferably the cups 8 are spaced somewhat from each other leaving a gap, interval or chamber 14 between two fixed cups for the reception of the adjacent flanges 13, 13 of a pair of movable outer cups which act as pistons in the chambers 14. In the drawing, I have exaggerated, for the purpose of illustration, the space between the pairs of fixed cups 8, 8. In practice the flanges 10, 10 of two pairs of fixed cups are spaced apart a sufficient distance to receive the adjacent flanges 13, 13 and leave a small air space between the movable flanges 13, 13 and the fixed flanges 10, 10. This insures an immediate even distribution of the air pressure within my wheel. The passage of the air between the fixed flanges 10, 10 and the movable flanges 13, 13 serves to reduce the friction at this point and to prevent any undue heating of the parts.

The outer cup members 12 are preferably formed with domes 16 around which is molded the outer shoe, of any suitable material, 17, which is provided with the clenchers 18, 18 to fit in the clencher grooves 7, 7 of the rim 3 and be held in that position by the two clencher locking rings 19, 19. These rings are each equipped with one or more turn buckles 20 to coöperate with the two threaded ends 21, 21 on the locking rings.

Ordinarily, the molding of the outer shoe 17 around the outer members 12, is sufficient to prevent any relative movement between the movable cups 12 and the shoe 17. The series of projections 22 on the shoe 17 fitting in between the pairs of outer cups serve to aid this end. In some instances, in addition to the friction of the shoe 17 and the inner cups 12, I secure them together in any suitable manner such as by a series of bolts 23 and nuts 24. The heads 25 of the bolts serve as an armor to the outer shoe 17 and as an anti-skid device. These bolts and nuts may be replaced with new ones as their heads wear out.

In practice, I preferably make the inner cups 8 and outer cups 12 of very thin sheet metal, for example, sheet steel, but it is to be understood that my invention is not to be limited to this or any other particular materials nor to the particular shape shown.

To inflate my puncture proof wheel, an ordinary pump is connected to the valve 5 and air is forced into the hollow rim and into the chamber 4 passing through the different openings 6 into each pair of fixed and movable cups, whatever their particular shape may be. The pressure is evenly distributed, not only in the different pairs of cups, but also in the chambers 14, 14. It is obvious that in practice the pressure of the contained air will be transmitted from the inner chamber 4 to the different pairs of inner and outer cups and cylinders 14 in substantially the same manner that the pressure is distributed in an inner tube of an ordinary pneumatic tire. It is also clear that no nail, pin, glass or other article can puncture the tire for the reason that it would always be stopped by the outer members or cups. That portion 26 of the outer shoe may be disregarded as this is so far from the periphery of the wheel, that in practice a puncture would not occur at this point. The adjustment of the locking rings 19 is such as to prevent any leakage of air between the clencher and the clencher groove 7.

While any suitable number of inner and outer cups may be used, I prefer some definite relation between their size and the circumference of the wheel 1. With a wheel of 110 inches in circumference, which is an ordinary size, I prefer to use inner and outer cups which will make the distance between the points 28 five inches. This insures that the weight of the wheel will always be carried by one pair of inner and outer cups, or may be divided between two such pairs, although as I have previously stated the number of fixed and movable members and the distance between the points 28, 28 may be varied as found convenient or expedient.

Having thus described this invention in connection with illustrative embodiments thereof to the details of which I do not desire to be limited, what is claimed as new and what is desired to secure by Letters Patent is set forth in the appended claim.

In a puncture proof vehicle wheel, the combination of a wheel having a hollow rim provided with a plurality of openings on its circumference, hollow fixed members mounted on the rim and held fast to it and separated from each other, said hollow members having upwardly extending fixed flanges and openings to register with those in the rim, the spaces between the fixed flanges forming restricted chambers, a tire shoe, hollow members carried by the shoe and provided with downwardly extending flanges to act as pistons in the restricted chambers between the fixed members, there being air passages between the fixed and hollow members and the restricted chambers interposed between them, said restricted chambers, and said pistons moving within the restricted chambers, adapted to act as auxiliary cushions.

MAX DRUCKERMAN.

Witnesses:
 ALAN M. JOHNSON,
 M. WALSH.